(12) United States Patent
Cote

(10) Patent No.: US 9,586,674 B2
(45) Date of Patent: Mar. 7, 2017

(54) COLLAPSIBLE AIRFOIL SPOOLED RETRACTABLE ROTOR

(71) Applicant: Kenneth A. Cote, San Diego, CA (US)

(72) Inventor: Kenneth A. Cote, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 305 days.

(21) Appl. No.: 14/517,641

(22) Filed: Oct. 17, 2014

(65) Prior Publication Data

US 2016/0107745 A1  Apr. 21, 2016

(51) Int. Cl.
| | | |
|---|---|---|
| *B64C 11/00* | (2006.01) | |
| *B64C 27/26* | (2006.01) | |
| *B64C 27/30* | (2006.01) | |
| *B64C 27/473* | (2006.01) | |

(52) U.S. Cl.
CPC ............ *B64C 11/003* (2013.01); *B64C 27/26* (2013.01); *B64C 27/30* (2013.01); *B64C 27/473* (2013.01); *Y02T 50/66* (2013.01)

(58) Field of Classification Search
CPC ....... B64C 11/003; B64C 27/26; B64C 27/30; B64C 27/473
See application file for complete search history.

(56) References Cited

U.S. PATENT DOCUMENTS

| | | | |
|---|---|---|---|
| 2,172,333 A | | 9/1939 | Theodorsen et al. |
| 3,101,121 A | | 8/1963 | MacNeal |
| 3,120,275 A | | 2/1964 | Pfleiderer et al. |
| 3,184,187 A | | 5/1965 | Isaac |
| 3,298,142 A | | 1/1967 | Isaac |
| 3,633,850 A | * | 1/1972 | Feldman ................. B64C 27/00 244/1 R |
| 3,637,168 A | | 1/1972 | Ryan et al. |
| 4,485,991 A | * | 12/1984 | Fuller ...................... B64C 3/56 244/123.11 |
| 5,642,982 A | * | 7/1997 | Matuska ............. B64C 29/0033 416/87 |
| 6,655,915 B2 | * | 12/2003 | Gmirya .................. B64C 11/28 416/170 R |
| 2009/0274557 A1 | | 11/2009 | Vasyl | |

FOREIGN PATENT DOCUMENTS

CN      2455618 Y      10/2001

* cited by examiner

*Primary Examiner* — Igor Kershteyn
(74) *Attorney, Agent, or Firm* — Tarolli, Sundheim, Covell & Tummino LLP

(57) ABSTRACT

A retractable rotor system for an aircraft includes a rotor blade with a leading edge, a trailing edge, and an internal collapsible web. The leading edge includes a flexible portion whose lower edge contacts but is not structurally joined to the lower skin. When the leading edge is peeled forward from the lower skin, the blade elastically collapses to the thickness of its constituent layers. The rotor blade extends through a support frame connectable to the aircraft to secure the rotor blade to a spool. Rotating the spool retracts the rotor blade through the support frame while pulling the rotor blade over a fixed actuating member, placing the rotor blade in the collapsed condition and winding the rotor blade onto the spool. Rotating the spool in the opposite direction unwinds the rotor blade from the spool, through the frame, causing the rotor blade to relax into the expanded condition.

22 Claims, 8 Drawing Sheets

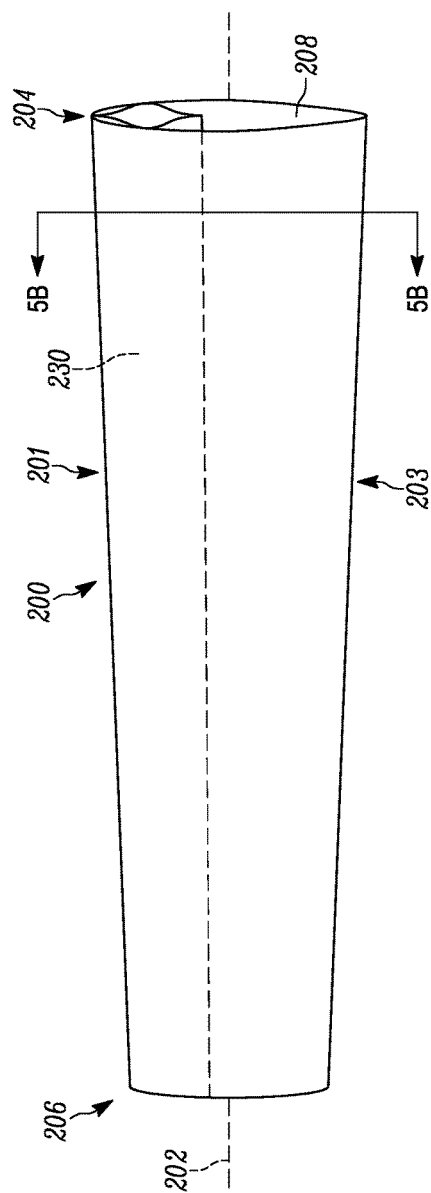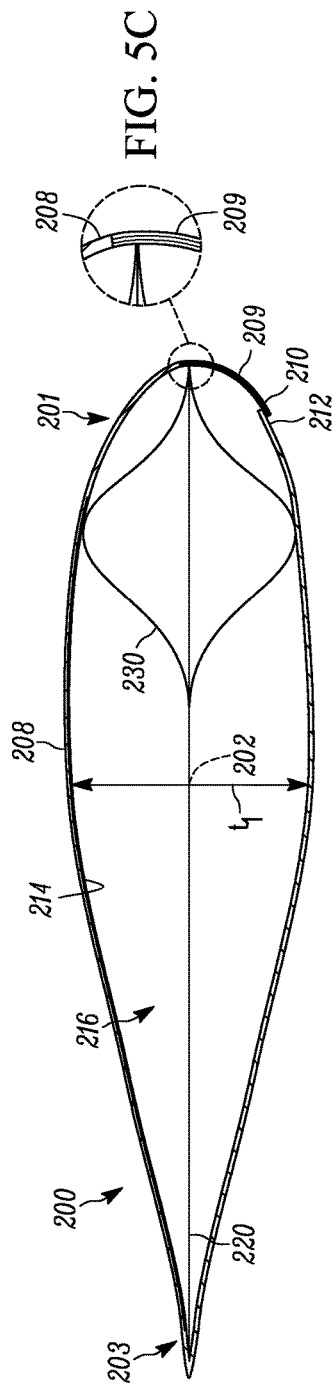

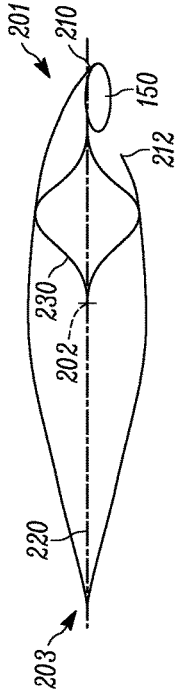
FIG. 7A
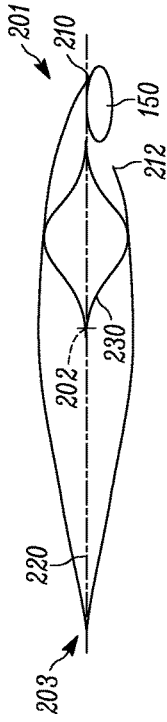
FIG. 7B
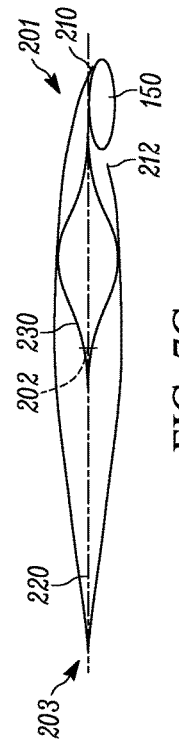
FIG. 7C
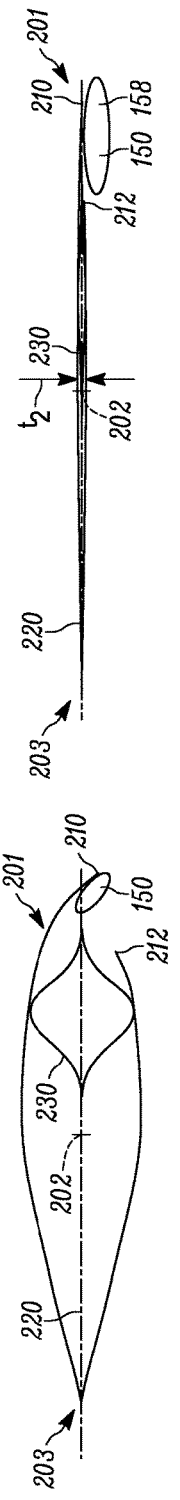
FIG. 7D
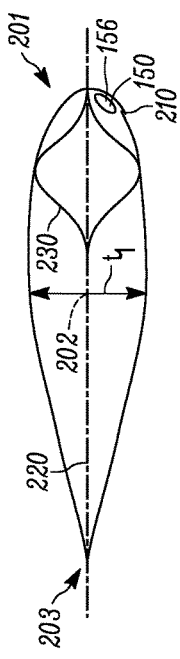
FIG. 7E
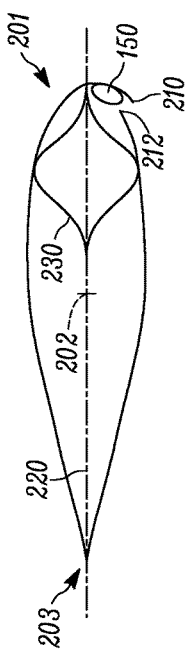
FIG. 7F
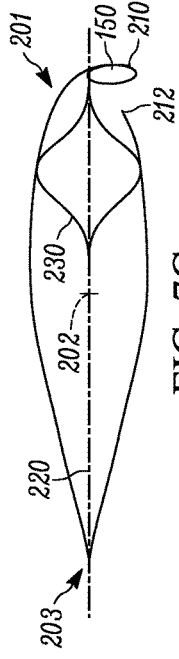
FIG. 7G
FIG. 7H

COLLAPSIBLE AIRFOIL SPOOLED RETRACTABLE ROTOR

TECHNICAL FIELD

The present invention relates generally to rotors and, more specifically, to a collapsible rotor blade for an aircraft.

BACKGROUND

Rotors have been used in aircraft for some time and provide the aircraft with vertical take-off and landing (VTOL) capability, thereby increasing the terrain and environment in which the aircraft can be used. The greatest VTOL lift versus power is currently obtained by large diameter, open rotor aircraft, namely helicopters. However, the forward speed of helicopters is limited by the rotor due to the reduced relative airspeed of the retreating blades, which causes them to stall. Even at moderate forward speeds a great deal of power is required to overcome large drag forces due to pulling the large, spinning rotor and hub system through the air at speed, and the high Mach number of the forward traveling blades. It is therefore desirable to provide an aircraft rotor that provides for both VTOL lift capability as well as high aircraft speed.

SUMMARY OF THE INVENTION

A retractable rotor system for an aircraft includes a retractor connectable to the aircraft and having a spool rotatable in a first direction and a second direction opposite the first direction. A rotor blade extends along a radial axis and has a first end and a second end. The rotor blade is movable between a first condition having a first thickness to a second condition having a second thickness less than the first thickness. The rotor blade extends through a support frame connectable to the aircraft to secure the first end of the rotor blade to the spool. The spool is rotatable in the first direction to unwind the rotor blade from the spool and to extend the rotor blade away from the support frame and place the rotor blade in the first condition. The spool is rotatable in the second direction to wind the rotor blade on to the spool and to retract the rotor blade into the support frame and place the rotor blade in the second condition.

In another example, a retractable rotor system for an aircraft includes a retractor connectable to the aircraft and having a spool rotatable in a first direction and a second direction opposite the first direction. A rotor blade airfoil extends along a radial axis and has a first end secured to the spool and a second end extending away from the spool. The rotor blade airfoil includes a movable portion and a stationary portion each extending longitudinally along the rotor blade. The rotor blade is movable between a first condition having a first thickness that provides rigidity normal to the plane of the rotor blade, and a second condition having a second thickness less than the first thickness that provides flexibility normal to the plane of the rotor blade. A support frame connectable to the aircraft has a pair of passageways through which the rotor blade extends to secure the first end of the rotor blade to the spool. A fixed actuating member extends between the passageways and is positioned within the portion of the rotor blade that is in the first condition. The spool is rotatable in the first direction to unwind the rotor blade from the spool such that the actuating member causes the movable portion of the airfoil to move towards the stationary portion to place the rotor blade in the first condition. The spool is rotatable in the second direction to wind the rotor blade on to the spool such that the actuating member moves the movable portion of the airfoil away from the stationary portion to place the rotor blade in the second condition.

In another example, an aircraft includes a body and a pair of fixed wings and a rotor mast extending from the body. A gear positioned within the rotor mast is drivable by a motor or inner rotor shafts who's relative speed is controlled by a further system of gears and clutches. A plurality of retractable rotor systems each includes a retractor having a spool rotatable by the gear in a first direction and a second direction opposite the first direction. A rotor blade extends along an axis and has a first end secured to the spool and a second end extending away from the spool. The rotor blade airfoil includes a movable portion and a stationary portion each extending longitudinally along the rotor blade. The rotor blade is movable between a first condition having a first thickness that provides rigidity normal to the plane of the rotor blade and a second condition having a second thickness less than the first thickness that provides flexibility normal to the plane of the rotor blade. A support frame connected to the rotor mast has a pair of passageways through which the rotor blade extends to secure the first end of the rotor blade to the spool. A fixed actuating member extends between the passageways and is positioned within the portion of the rotor blade that is in the first condition. The spool is rotatable by the gear in the first direction to unwind the rotor blade from the spool such that the actuating member moves the movable portion towards the stationary portion to place the rotor blade in the first condition. The spool is rotatable by the gear in the second direction to wind the rotor blade on to the spool such that the actuating member moves the movable portion away from the stationary portion to place the rotor blade in the second condition.

In another example, a retractable rotor system for an aircraft includes a rotor blade with a rounded leading edge, a tapered trailing edge, and an internal collapsible web. The leading edge includes a flexible portion whose lower edge contacts but is not structurally joined to the lower skin. When the leading edge is peeled forward from the lower skin, the blade can be elastically collapsed to the thickness of its constituent layers. The rotor blade extends through a support frame connectable to the aircraft to secure the rotor blade to a spool. Rotating the spool retracts the rotor blade through the support frame while pulling the rotor blade over a fixed actuating member, placing the rotor blade in the collapsed condition and winding the rotor blade onto the spool. Rotating the spool in the opposite direction unwinds the rotor blade from the spool, through the frame, causing the rotor blade to relax into the expanded condition.

BRIEF DESCRIPTION OF THE DRAWINGS

FIG. 5A is a top view of a rotor blade of the aircraft of FIG. 1.

FIG. 5B is a sectional view of the rotor blade of FIG. 5A taken along line 5B-5B.

FIG. 5C is an enlarged portion of FIG. 5B.

FIGS. 7A-7H are schematic illustrations of the actuating member of FIGS. 4A-4C changing the condition of the rotor blade of the rotor system.

DETAILED DESCRIPTION

Figure 1:
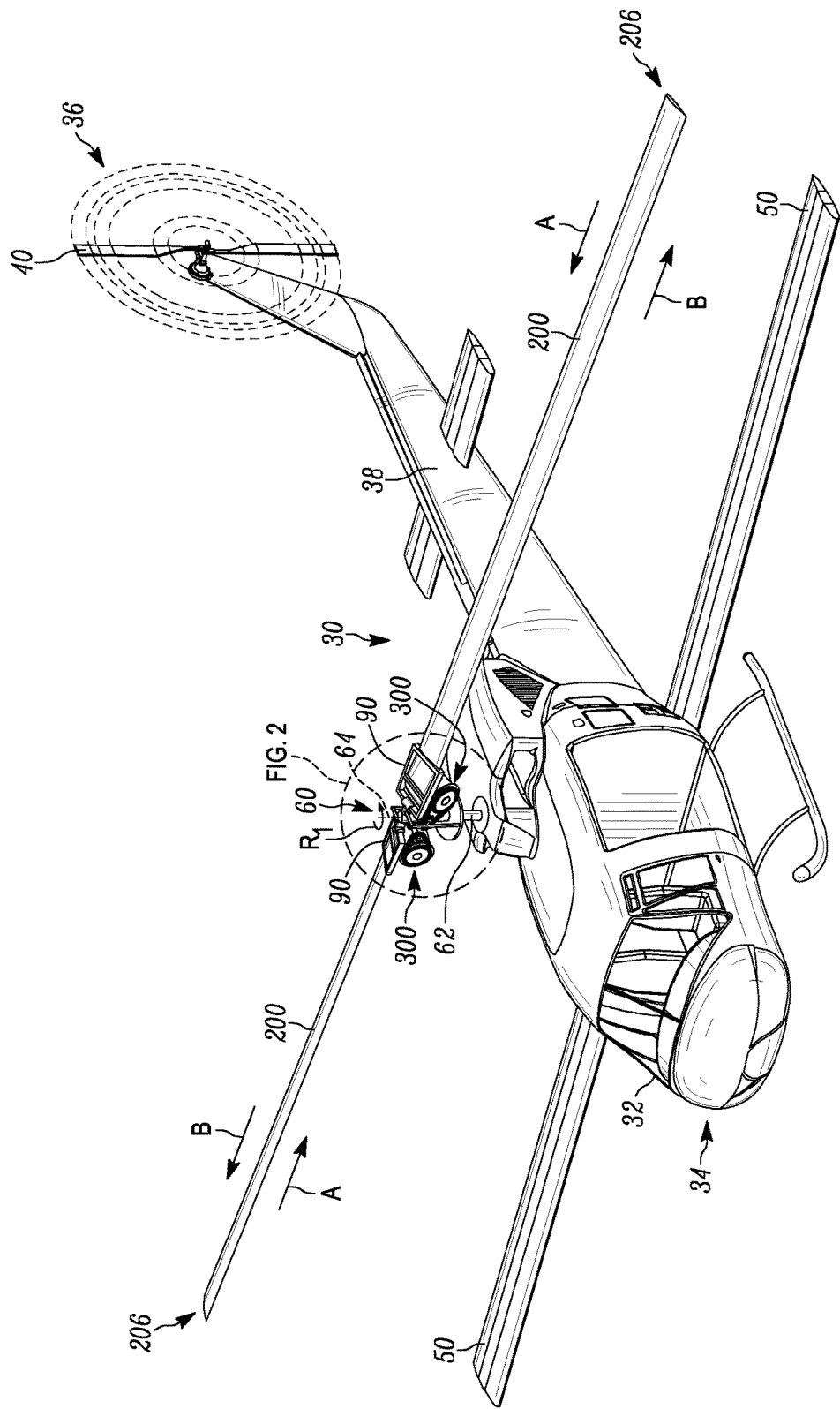
FIG. 1 is a schematic illustration of an example aircraft including a retractable rotor system.
Figure 2:
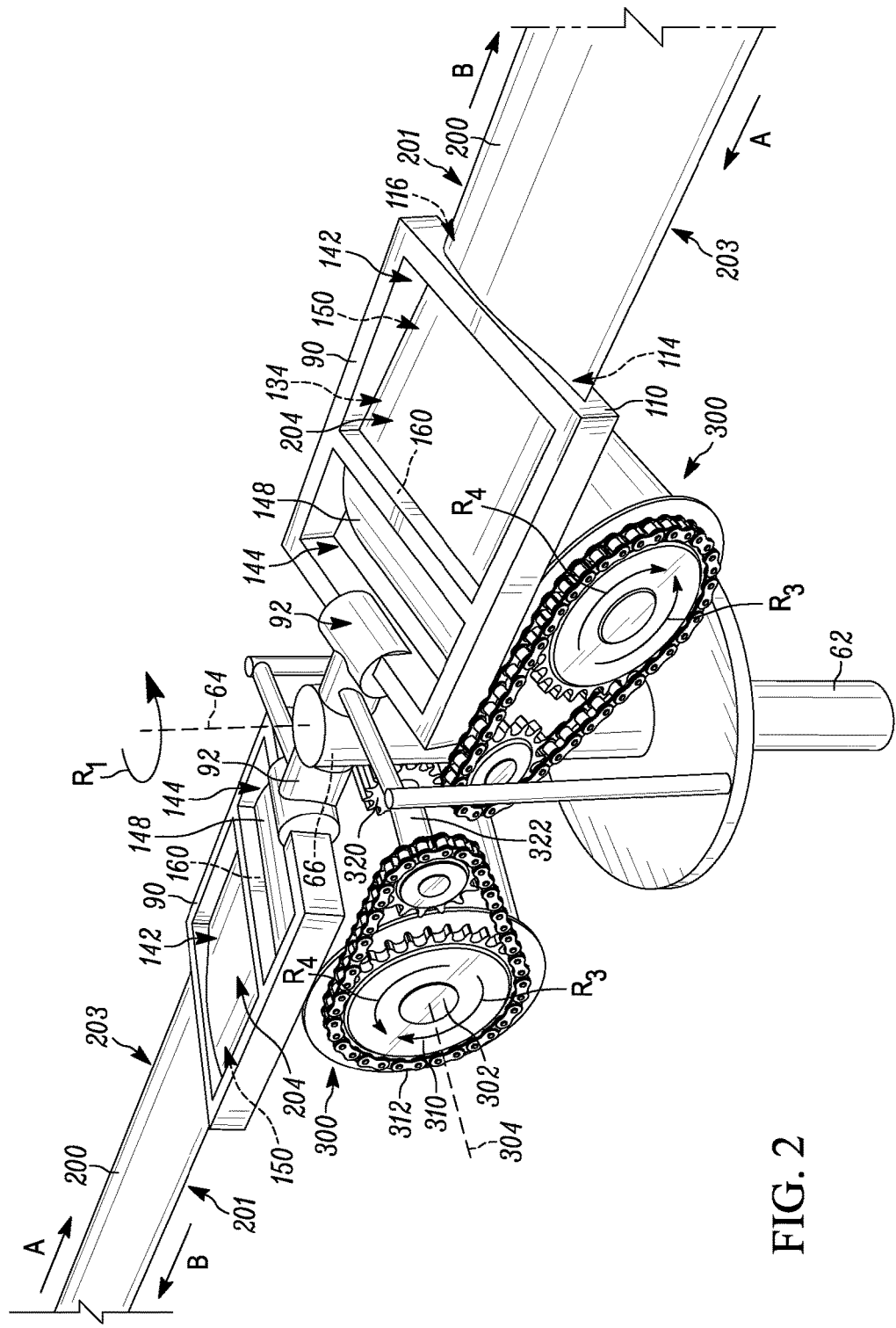
FIG. 2 is an enlarged view of a portion of the retractable rotor system of FIG. 1.

The present invention relates generally to rotors and, more specifically, to a collapsible rotor blade for an aircraft. FIGS. 1-6 illustrate an example retractable rotor system 60. Referring to FIGS. 1 and 2, the rotor system 60 is provided on an aircraft 30, such as a helicopter. The aircraft 30 includes a body 32 and a tail 38 and extends from a first or fore end 34 to a rear or aft end 36. A rotor mast 62 extends vertically from the body 32 and operably connects the rotor system 60 to the aircraft 30. The rotor system 60 acts as the main rotor for the aircraft 30 and selectively provides both lift and propulsion for the aircraft 30 in VTOL mode. A tail rotor 40 may be connected to the tail 38 for counterbalancing torque on the aircraft 30 applied by the rotor system 60 in VTOL mode. A pair of fixed wings 50 extends outwardly from the body 32 for high speed flight mode. Each wing 50 may include a means of propulsion, e.g., propeller or jet engine (not shown), for providing propulsion to the aircraft 30 in high speed flight mode.

The rotor system 60 includes at least two articulating base assemblies 90, a rotor blade 200 extending through each articulating base assembly 90, and a retractor 300 associated with each rotor blade 200 for selectively winding and unwinding the rotor blade 200 to retract (in the direction A in FIG. 1) and extend (in the direction B in FIG. 1) the rotor blade 200 relative to the base assembly 90. As shown, the rotor system 60 includes a pair of rotor blades 200 extending in opposite directions from the rotor mast 62, each with a corresponding base assembly 90 and retractor 300. It will be understood that the rotor system 60 may include more rotor blades 200 symmetrically arranged about the rotor mast 62, each with a corresponding articulating base assembly 90 and retractor 300. In any case, the blades 200 are rotatable about an axis 64 of the rotor mast 62 in the direction indicated generally by $R_1$ in FIGS. 1 and 2.

Figure 3A:
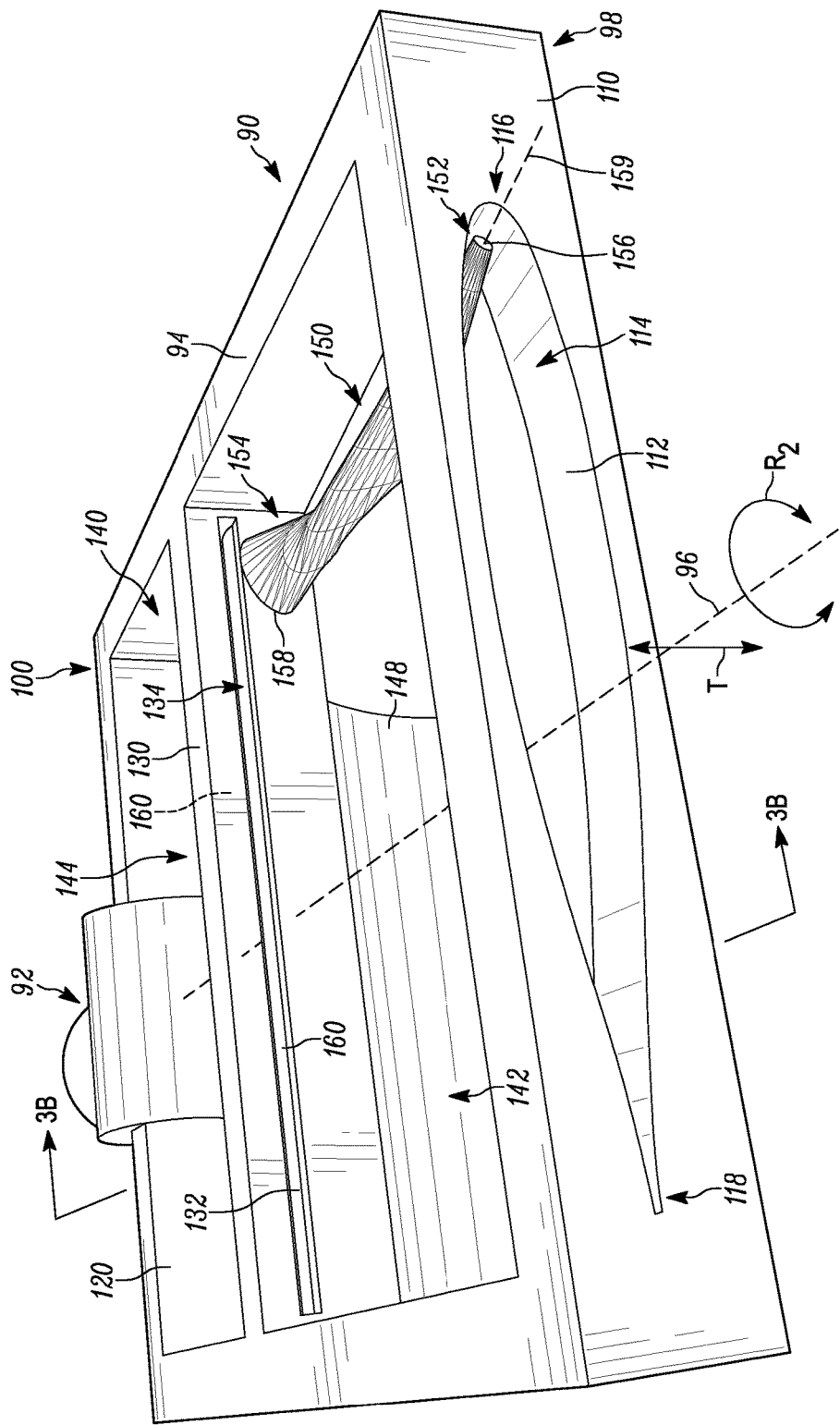
FIG. 3A is a perspective view of a support frame and fixed actuating member of the retractable rotor system of FIG. 1.
Figure 3B:
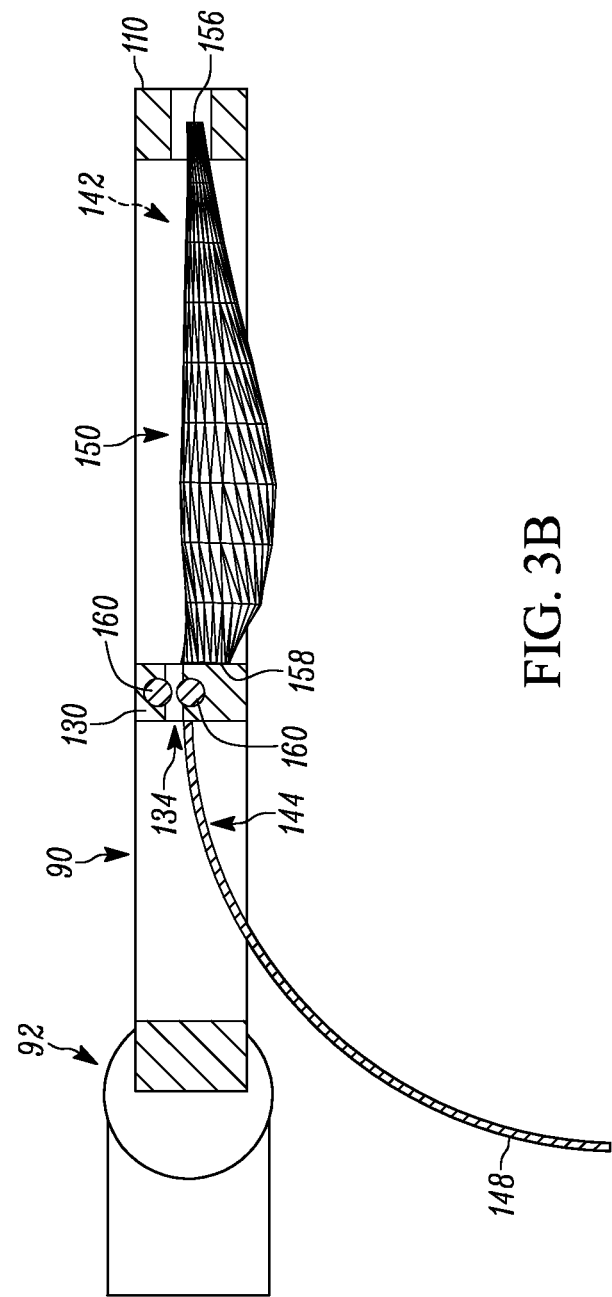
FIG. 3B is a sectional view of the support frame of FIG. 3A taken along line 3B-3B.

Referring to FIGS. 3A and 3B, the articulating base assembly 90 is made of typical aircraft material and includes a support frame 94 having a generally rectangular shape defining an interior space 140. The support frame 94 extends along a centerline or axis 96 from an outboard first end 98 to an inboard second end 100. The support frame 94 is connected to the rotor mast 62 on the aircraft 30 by one or more hinges 92 that allow the support frame 94 to articulate in multiple directions relative to the centerline 96. For example, the support frame 94 may rotate about the centerline 96 in the direction generally indicated by $R_2$ in FIG. 3A. Alternatively or additionally, the support frame 94 may tilt relative to the centerline 96 in the direction generally indicated by T, e.g., the second end 100 may pivot about the hinge 92 relative to the first or outboard end 98.

The support frame 94 includes an outer wall 110 at the outboard end 98 and an outer wall 120 at the inboard end 100. An inner surface 112 of the outer wall 110 defines a passageway 114 through the outer wall 110. The passageway 114 has a generally airfoil shape and is sized to slidably receive one of the rotor blades 200. The passageway 114 therefore includes a rounded leading edge 116 and a more tapered trailing edge 118.

An inner wall 130 is located axially along the centerline 96 between the outer walls 110, 120 and within the interior space 140. The inner wall 130 divides the interior space 140 into a portion 142 between the inner wall 130 and the outboard wall 110 and a portion 144 between the inner wall 130 and the inboard wall 120. An inner surface 132 of the inner wall 130 defines a passageway 134 through the inner wall 130. The passageway 134 has a generally rectangular shape. A curved guide member 148 may extend from the inner wall 130, into the second portion 144 of the interior 140, and downward towards the retractor 300 (see FIG. 3B). The guide member 148 is secured to or integrally formed with the inner wall 130 at a position above the second passageway 134.

A pair of rollers 160 (shown in phantom) is provided within cavities (not shown) of the inner wall 130 and extends along the length of the inner wall 130. The rollers 160 are supported for rotation relative to the inner wall 130 along axes (not shown) perpendicular to the centerline 96 of the support frame 90. The rollers 160 partially extend into the passageway 134 and are vertically spaced apart a predetermined distance from one another.

A fixed actuating member 150 is secured to the support frame 94 and extends between the inner wall 130 and the outer wall 110. More specifically, the actuating member 150 extends from a first or outboard end 152 positioned within the passageway 114 of the outer wall 110 to a second or inboard end 154 secured to the inner wall 130 at a position below the passageway 134 in the inner wall 130. The outboard end 152 of the actuating member 150 extends into the outboard end 116 of the passageway 114 and is spaced from the inner surface 112. The actuating member 150 has a generally shoehorned shape configured to unzip or peel open the movable portion 209 of the rotor blade 200 as the rotor blade 200 is retracted in the direction A to be wound on the retractor 300. Although one example construction of the actuating member 150 is described, it will be appreciated that the actuating member 150 may exhibit any shape and/or contour capable of performing the aforementioned unzipping or peeling action on the retracting rotor blade 200.

Figure 4B:
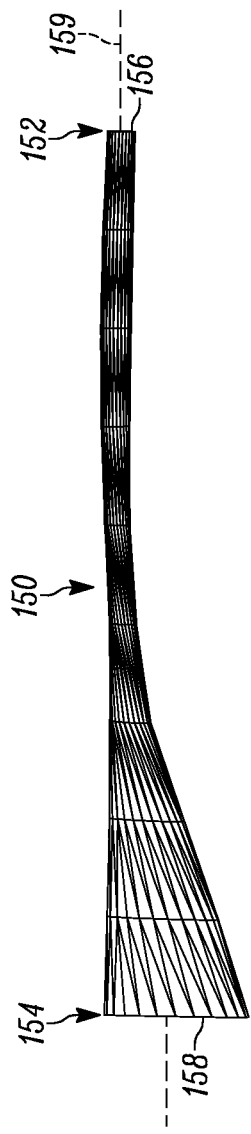
FIG. 4B is a side view of the actuating member of FIG. 4A.
Figure 4C:
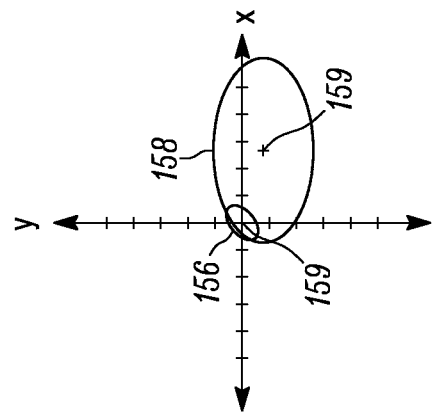
FIG. 4C is a graph illustrating first and second ends of the actuating member of FIG. 4A.
Figure 4A:
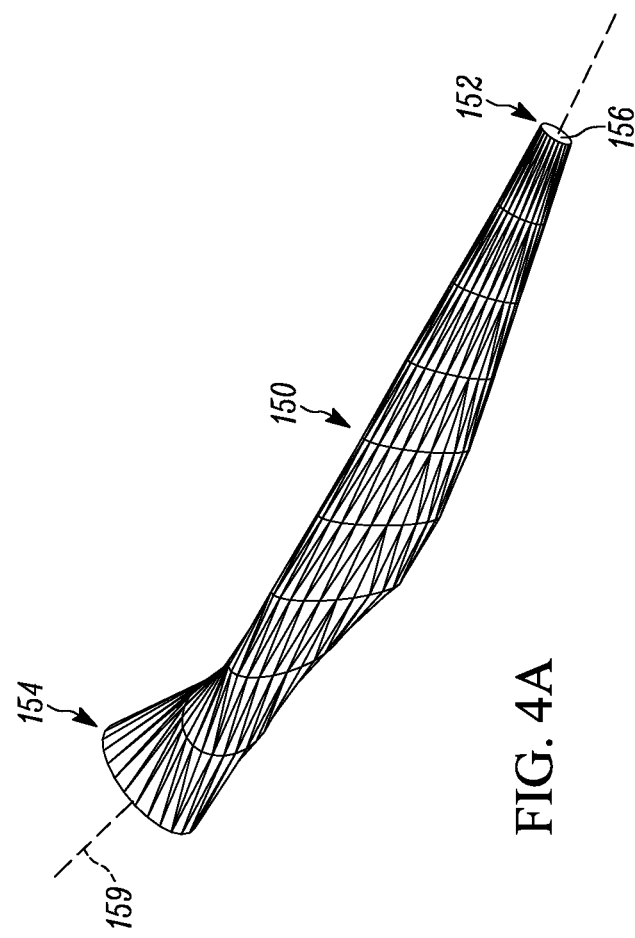
FIG. 4A is an isometric view of an actuating member of the retractable rotor system of FIG. 1.

Referring to FIGS. 4A-4B, the actuating member 150 has a generally curved, frustoconical shape. The outboard end 152 of the actuating member 150 terminates at an end surface 156. The inboard end 154 of the actuating member 150 terminates at an end surface 158. As shown, the end surfaces 156, 158 each has a round or elliptical shape and the actuating member 150 has a round or elliptical cross-section along its entire length between the end surfaces 156, 158. It will be appreciated, however, that the end surfaces 156, 158 and/or portions of the lengthwise cross-section of the actuating member 150 may have one or more additional or alternative shapes, e.g., circular or polygonal. A longitudinal centerline 159 of the actuating member 150 may extend along a curved or arcuate path.

FIG. 4C illustrates the end surfaces 156, 158 of the actuating member 150 superimposed on an x-y Cartesian coordinate system. The lengthwise cross-section of the actuating member 150 undergoes several spatial changes between the end surface 156 and the end surface 158 relative to the x-y coordinate system shown. In particular, the elliptical cross-section of the actuating member 150 rotates counterclockwise, moves generally rightward in the x-y plane, and increases in size as the lengthwise cross-section moves from the outboard end surface 156 to the inboard end surface 158.

The rotor blade 200 is illustrated in more detail in FIGS. 5A-5C. The blade 200 has an elongated shape and extends radially along a centerline 202 from an inboard first end 204 to an outboard second end 206. The apparent taper of the rotor blade 200 is due only to the perspective of the drawing. The blade 200 extends perpendicularly relative to the centerline 202 between a fore or leading edge 201 and an aft or trailing edge 203. The blade 200 includes a first portion 208 defining the majority of the blade 200 that is largely stationary, and in concert with the collapsible web members 230 constitutes a closed aft section. The blade 200 includes a second portion 209 extending from the first portion 208 that is largely movable, and closes the forward axial cross-section of the blade 200 only when in the first greater thickness condition. The first and second portions 208, 209 collectively define an inner surface 214 that defines an interior 216 of the blade 200.

The first portion 208 may constitute one or more layers of a material with a high yield strain such that the first portion 208 can sustain a relatively large bending deformations without yielding. In one example, the first portion 208 constitutes a single sheet or layer of Titanium 6-6-2-sta. Alternatively, the first portion 208 may constitute nylon. In any case, the first portion 208 is formed into a high performance airfoil shape by existing means, such as cold rolling for Titanium or extrusion for nylon. The distribution of material thickness along the blade 200, i.e., number of layers in the portions 208, 209, and their respective thickness(es), of the blade 200 may be configured to ensure the center of gravity of the blade 200 axial cross-section is not positioned aft of the quarter chord to help maintain blade aerodynamic pitch stability.

The second portion 209 extends forward from the first portion 208 and helps form the leading edge 201 of the blade 200. The second portion 209 includes a movable portion or edge 210 that cooperates with a stationary portion 212 on the first portion 208 to substantially close the leading edge 201. As shown, the movable and stationary edges 210, 212 are configured to abut or overlap one another at a position below the chord 220, although the edges 210, 212 may alternatively abut or overlap one another along or above the chord 220, and either or both may be movable (not shown). The movable and stationary edges 210, 212 are configured to move relative to one another while extending or retracting the rotor blades 200 during operation of the aircraft 30.

The second portion 209 may be formed by one or more layers of material that are thinner or more elastic than the layer of the first portion 208 (see FIG. 5C). In one example, the second portion 209 constitutes a series of stacked layers which are bonded together only where they attach to the first portion 208. In other words, a first end of each layer in the second portion 209 is directly secured to the first portion 208 and to one another, and the remainder of each layer in the second portion 209 is free from connection to the other layers in the second portion. Due to this construction, the minimum elastic radius of the second portion 209 is dictated largely by the individual layer thicknesses rather than the total thickness of the layer group. In another example (not shown), the second portion 209 constitutes a layer of material thicker than the layer of the first portion 208 with a much higher yield strain than the material of the first portion 208, e.g., an elastomer. In any case, the bottom of the movable portion 210 is configured to overlap and be biased into firm engagement with the foremost portion of the stationary portion 212. In this condition, the axial cross-section of the blade 200 (FIG. 5B) has comparable shape, tension, bending, and torsion strength as a conventional helicopter blade. It will be understood that the axial cross-section in FIG. 5B is exaggerated in the direction of the chord 220 for clarity.

One or more collapsible web members 230 are positioned within the interior 216 of the blade 200 and extend along the length of the blade 200. Each collapsible web member 230 may constitute a conventional compression spring or the like that helps maintain the airfoil shape of the blade 200 when the blade 200 is fully retracted from the support frame 90. Each collapsible web member 230 is secured to the inner surface 214 of the blade 200 via bonding or the like. Securing the collapsible web members 230 to the inner surface 214 of the blade 200 in this manner closes the shear path through the blade 200 so that it can support bending and torsion. Each collapsible web member 230 may be positioned closer to the leading edge 201. When the collapsible web member 230 is uncompressed and the blade 200 unconfined, the blade 200 has a thickness $t_1$ measured in a direction through and substantially perpendicular to the centerline 202 of the blade 200.

Figure 6:
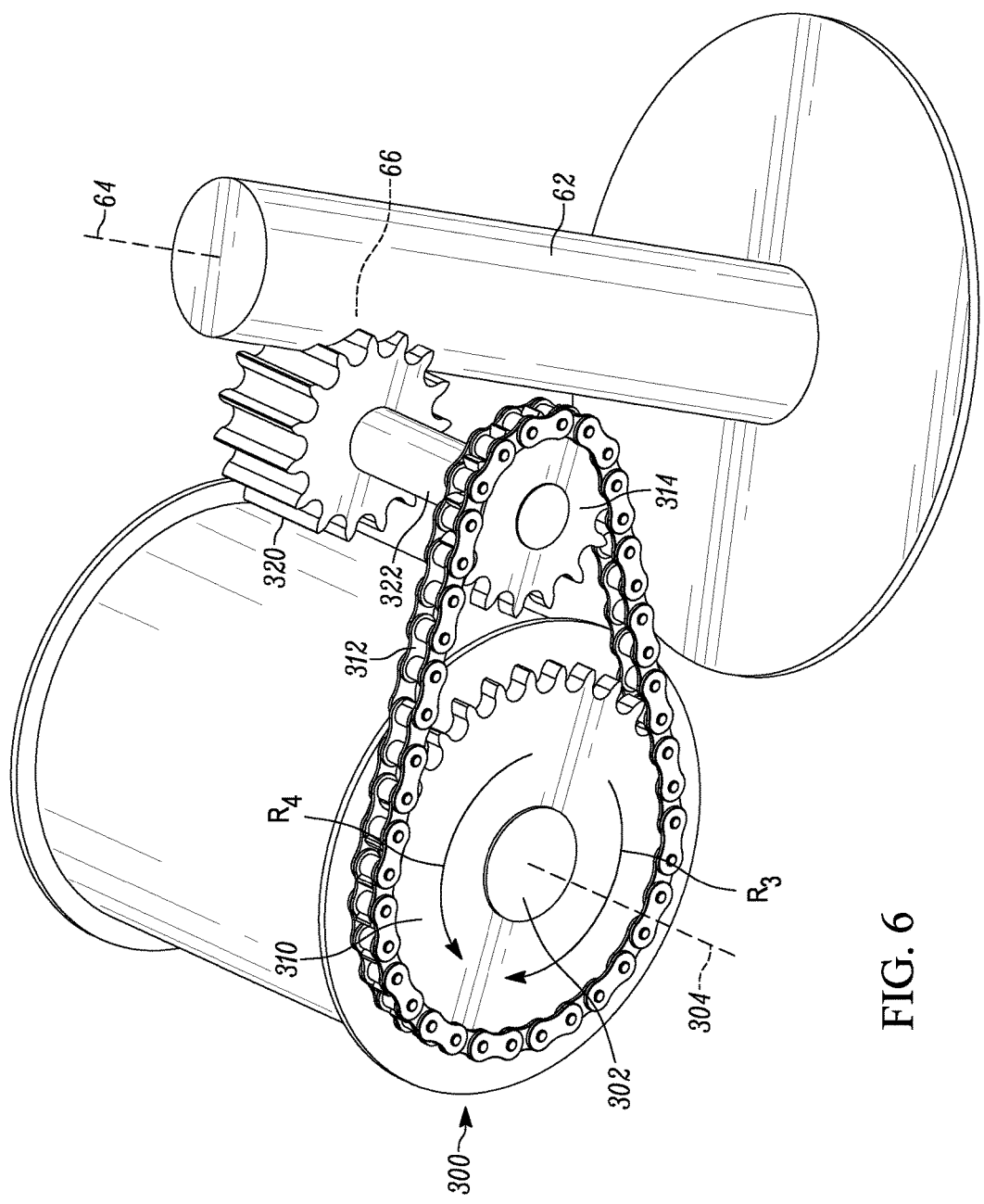
FIG. 6 is a portion of an assembly view of the retractable rotor system of FIG. 1.

Referring to FIG. 6, the retractor 300 is coupled to the rotor mast 62 and is configured to selectively retract and extend each blade 200 relative to the corresponding support frame 90 and relative to the axis 64 of the rotor mast 62. The retractor 300 includes a spool 302 supported for rotation about an axis 304 in the directions indicated generally by $R_3$ and $R_4$. In particular, the spool 302 may be operably connected to a worm gear 66 within the rotor mast 62 such that rotation of the worm gear 66 by a motor or planetary gear & clutch system (not shown) of the aircraft 30 results in rotation of the spool 302. The spool 302 is secured to a sprocket 310 that rotates with the spool 302. A shaft 322 adjacent the rotor mast 62 is secured to a spur gear 320 and a sprocket 314 that rotate with the shaft 322. The gear 320 on the shaft 322 is in meshed engagement with the worm gear 66 within the rotor mast 62. The sprocket 314 on the shaft 322 transmits torque to the sprocket 310 on the spool via a chain 312. Consequently, rotation of the worm gear 66 in either direction is transmitted to the gear 320, which causes the shaft 322 to rotate and transmit the torque to sprocket 314, through the sprocket 314 to the chain 312, through the chain 312 to the sprocket 310, and ultimately to the spool 302, thereby causing rotation of the spool 302 about the axis 304 in one of the directions $R_3$ or $R_4$. Although only a single retractor 300 is described it will be appreciated that, in the illustrated example, the worm gear 66 within the rotor mast 62 is in meshed engagement with a pair of gears 320 on opposing sides of the rotor mast 62—each gear 320 being associated with a different retractor 300 and causing rotation of a corresponding spool 302. In other words, rotation of the worm gear 66 results in simultaneous rotation of all spur gears 320 in meshed engagement therewith and, thus, rotation of all spools 302 operably coupled to the worm gear 66 in the same direction $R_3$ or $R_4$.

When the rotor system 60 is assembled (see FIG. 2), the retractor 300 is operably connected to the rotor mast 62 and the hinge 92 secures the support frame 90 to the rotor mast 62 above the retractor 300. In this configuration, the guide member 148 extends partially around, and is spaced from, the spool 302 while following the general circumferential contour of the spool 302. The rotor blade 200 is slidably received in the corresponding support frame 90. In particular, the first end 204 of the blade 200 is oriented such that the leading edge 201 is aligned with the leading edge 116 of the passageway 114 in the outer wall 110. The first end 204 of the blade 200 is then passed through the airfoil-shaped passageway 114 such that the actuating member 150 is positioned within the interior 216 of the blade 200 adjacent the leading edge 201. The first end 204 of the blade 200 subsequently extends through the first portion 142 of the interior space 140, between the rollers 160 extending into the second passageway 134, and into the second portion 144 of the interior space 140. The first end 204 of the blade 200 then extends beneath the curved contour of the guide member 148 downward towards the retractor 300, and is ultimately secured to the spool 302 in a manner that allows the blade 200 to be wound on and unwound from the spool 302 upon rotation thereof. The configuration for each support frame 90, corresponding blade 200, and retractor 300 is identical to that described.

As noted, actuation of the rotor system 60 causes the worm gear 66 within the rotor mast 62 to rotate about the axis 64. Torque from the worm gear 66 is transferred through each gear 320 and shaft 322 to each sprocket 314, which transfers the torque to the corresponding sprocket 302 through the chain 312. Since the first end 204 of each blade 200 is secured to the corresponding spool 302, rotation of the spools 302 in the direction $R_3$ winds the blades 200 on to the spools 302, thereby retracting the blades 200 into the corresponding support frames 90, as indicted by the arrows A. Conversely, rotation of the spools 302 in the direction $R_4$ unwinds the blades 200 from the spools 302, thereby extending the blades 202 away from the corresponding support frames 90, as indicted by the arrows B.

Due to the hollow interior 216 of the blade 200 and thin construction of both the first and second portions 208, 209, when the movable portion 209 is peeled forward and approximately co-planar with 208, the blade 200 can be readily vertically compressed, i.e., in the direction of the thickness $t_1$, to allow for passage of the blade 200 between the rollers 160, downward bending towards the retractor 300, and winding about the retractor 300. To this end, a low density, non-structural material may be bonded to the first portion 208 at the trailing edge 203 to maintain roughly constant chordwise thickness when the blade 200 is flat so that the blade 200 wraps straight on the spool 302.

Referring to FIGS. 7A-7H, when the spools 302 rotate in the direction $R_3$, the actuating members 150 act on the retracting blades 200 to facilitate collapsing of the blades 200 sufficient to allow the collapsed blades to pass between the rollers 160 and be wound onto the spools 302. Although retraction of only a single blade 200 is discussed, it will be appreciated that any and all blades 200 in the rotor system 60 are simultaneously retracted with the help of the corresponding actuating members 150 and rollers 160 for each additional blade 200.

As the spool 302 rotates in the direction $R_3$, the axial cross-section of the blade 200 passes through the airfoil-shaped passageway 114 in the outer wall 110 and subsequently over the outboard end 152 of the actuating member 150. The actuating member 150 acts on the retracting blade 200 to facilitate collapsing of the blade 200 from the expanded thickness $t_1$ (see FIG. 7A) to a collapsed thickness $t_2$ (see FIG. 7H) less than the expanded thickness $t_1$. Referring to FIGS. 7A-7H, the configuration of the actuating member 150 (see FIGS. 4A-4C) causes the movable portion 210 of the blade 200 to move upward and away from the stationary portion 212 as the blade 200 retracts across the actuating member 150 towards the rotating spool 302 until the blade 200 transitions from the fully expanded condition (FIG. 7A) to the fully collapsed condition (FIG. 7H). In particular, the actuating member 150 moves the movable portion 210 from a position extending below the chord 220 to a position co-planar with or above the chord 220 as the blade 200 moves from the end surface 156 (see FIG. 7A) of the actuating member 150 to the end surface 158 (see FIG. 7H). By moving the movable portion 210 in this manner, the actuating member 150 elongates the airfoil shape of the blade 200, which facilitates vertical compression of the blade 200 by the rollers 160 to the collapsed thickness $t_2$.

Due to the length and configuration of the actuating member 150, adjacent axial cross-sections of the blade 200 exhibit different stages of transition between the expanded condition and collapsed condition. More specifically, the closer the axial cross-section of the blade 200 is to the inboard end 154 of the actuating member 150 adjacent the rollers 160, the closer that axial cross-section is to reaching the collapsed condition. Once the particular axial-cross section of the blade 200 passes over the entire length of the actuating member 150 the peeled section of the blade 200 is vertically compressed between the rollers 160 to a thickness $t_2$ that is less than the thickness $t_1$ and approaches the collective thickness of the layers forming the blade 200, i.e., the blade 200 is compressed flat such that the interior 216 is substantially or wholly eliminated. The rollers 160 overcome the bias of the collapsible web 230 in order to vertically compress the blade 200 and place the blade 200 in the fully collapsed, substantially flat condition in which it can be wound on the spool 302. Vertical compression of the blade 200 is facilitated by the first end 204 of the blade 200 being bent along the guide member 148 and downward towards the spool 302 to be wound thereon.

Due to the material selection and material thickness of the blade 200, vertical compression of the blade 200 occurs without plastic deformation thereof. Furthermore, the combined material thickness(es) of the blade 200 when collapsed is such that the minimum elastic bend radius of the blade 200 is smaller than the radius of the spool 302. Consequently, the collapsed blade 200 is readily wound upon the rotating spool 302 during retraction of the blade 200. The flat blade 200 provides little resistance to flapping or torsion since it has minimal vertical section modulus and effectively an open shear flow. This allows the portions of the blade 200 outboard of the support frame 90 to behave like a standard helicopter blade.

Referring to FIG. 2, the collapsed portions of the blade 200 exit the rollers 160 and pass into the second portion 144 of the interior 140. It will be appreciated that the rollers 160, in combination with the tension applied to the blade 200 by the rotating spool 302, may cause the portion of the blade 200 adjacent the inboard end 154 of the actuating member 150 to reach the collapsed condition prior to entering the rollers 160.

In any case, the collapsing process—peeling of the movable portion 210 by the actuating member 150 and compression by the rollers 160—is repeated for each successive axial cross-section of the blade 200 along the length of the blade 200. Consequently, each successive, collapsed axial cross-section of the blade 200 passes downward through the second portion 144 of the interior 140 and along the curved guide member 148 to be wound on to the rotating spool 302. This occurs until the second end 206 of the blade 200 is positioned within the passageway 114 in the outer wall 110 of the support frame 90, i.e., the blade 200 does not extend radially outward of the support frame 90 relative to the axis 64 of the rotor mast 62. The retraction, winding, and placement of the second end 206 of the blade 200 occurs simultaneously for all blades 200 in the rotor system 60 due to the meshed engagement of the worm gear 66 with the gear 320 of each retractor 300 present. Once all the blades 200 are fully retracted, the aircraft 30 may commence with fixed wing 50 flight. Further drag reductions may be achieved by closing a streamlined fairing (not shown) over the retracted rotor/hub system for high speed flight.

In operation, the aircraft 30 rotates the blades 200 in the direction $R_1$, takes off vertically, and transitions to a moderate forward flight speed in standard helicopter mode. When the aircraft 30 is in the air and fixed wing 50 flight is desirable, the tail rotor 40 may be rotated aft and power is redirected from the rotor system 60 to the tail rotor 40, which now acts as a pushing propeller for the aircraft 30. Alternatively, power may be directed to forward or aft facing propellers (not shown) elsewhere on the aircraft 30 for fixed wing propulsion. The rotor system 60 can then transition to unpowered autorotation. The aircraft 30 speed is increased further using its fixed wing propeller(s) until the fixed wings 50 can support the aircraft's weight. The rotor system 60 collective is then reduced to a zero-lift state. At this time, the rotor system 60 is actuated to rotate the spools 302 in the first direction $R_3$ to retract all blades 200 inward toward the respective support frame 90 in the direction A, and allow for high speed fixed wing 50 flight.

When it is desirable to perform vertical takeoff and landing or return to helicopter flying mode, the rotor system 60 is actuated to rotate the spools 302 in the direction $R_4$ to extend all blades 200 outward away the respective support frame 90 in the direction B. With each blade 200, as the spool 302 rotates in the direction $R_4$, the actuating member 150 acts on the extending blade 200 to facilitate expansion of the blade 200 back to the thickness $t_1$. The process for placing the blade 200 in the expanded condition is identical to the process described above with regards to FIGS. 7A-7H, but in reverse order. Consequently, as the collapsed axial cross-sections of the blade 200 are unwound from the rotating spool 302, each passes upward along the guide member 148, through the second portion 144 of the interior space 140, and between the rollers 160. The collapsed axial cross-sections of the blade 200 then move on to the inboard end 154 of the actuating member 150 and pass along the length of the actuating member 150 towards the outboard end 152.

Moving the blade 200 across the actuating member 150 in this direction causes the movable portion 210 to move downwards and towards the stationary portion 212, allowing the blade 200 to transition from the collapsed condition to the expanded condition. The axial-cross sections of the blade 200 move off the actuating member 150 and pass through the passageway 114 in the outer wall 110 in the fully expanded condition of FIG. 7A. Once the axial cross-sections of the blade 200 move away from the rollers 160 and support frame 90, the collapsible web member 230 is allowed to fully expand and bias the blade 200 towards the expanded condition. The collapsible web member 230, in cooperation with the airfoil-shaped passageway 114 in the support frame 90, helps maintain the blade 200 in a substantially rigid, airfoil shape once the blade 200 is fully extended from the support frame 90.

The rotor system 60 is advantageous in that the blades maintain a high quality airfoil shape while exhibiting high strength and stiffness in the expanded condition, all while providing the degrees of freedom expected of a helicopter rotor blade and having the capability of being compactly stored in the collapsed condition. Furthermore, the extended blades maintain a smooth, carefully controlled airfoil profile to provide the high lift and low drag needed for current helicopter applications. The extended blades also exhibit sufficient bending stiffness to support the non-uniform radial lift distributions seen in forward flight without excessive bending. Moreover, the root or first ends of the extended blades are capable of accepting collective and cyclic pitch inputs and provides flapping freedom comparable to current helicopter rotors. High hover efficiency can be maintained due to low rotor disk loading and minimal forward flight drag penalty exists during operation, especially if a fairing is closed over the retraced rotor/hub system. In summation, the rotor system achieves in flight rotor retraction and high speed VTOL in a compact package that is not much larger than current rotor mechanics.

Additionally, the extended blades' torsion stiffness is sufficient to efficiently transmit rapid cyclic pitches from the root to the entire radius, comparable to current helicopter blades. The partially retracted blades' bending stiffness is sufficient to prevent the forward facing blades from buckling in forward flight with the lower centripetal forces seen during extension and retraction. All of the above advantages are achieved with minimal changes to the familiar control or dynamics of helicopter flight. In fact, the rotor system described herein may be configured for retrofitting on existing helicopter rotor masts with reduced cost and complexity in installation.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A retractable rotor system for an aircraft comprising:
   a retractor connectable to the aircraft and having a spool rotatable in a first direction and a second direction opposite the first direction;
   a rotor blade extending along a radial axis and having a first end secured to the spool and a second end extending away from the spool, the rotor blade being movable between a first condition having a first thickness and a second condition having a second thickness less than the first thickness; and
   a support frame connectable to the aircraft through which the rotor blade extends and which the rotor blade engages to secure the first end of the rotor blade to the spool;
   wherein the spool is rotatable in the first direction to unwind the rotor blade from the spool and to extend the rotor blade away from the support frame and place the rotor blade in the first condition, and the spool is rotatable in the second direction to wind the rotor blade on to the spool and to retract the rotor blade into the support frame and place the rotor blade in the second condition.

2. The retractable rotor system of claim 1, wherein the rotor blade has an expanded, airfoil shape in the first condition and a collapsed, substantially planar shape in the second condition.

3. The retractable rotor system of claim 1, further comprising a collapsible web positioned within an interior of the rotor blade to bias the rotor blade towards the first condition.

4. The retractable rotor system of claim 1, wherein the support frame includes spaced-apart first and second passageways for receiving the rotor blade.

5. The retractable rotor system of claim 4, wherein the first passageway has an airfoil shape for receiving the rotor blade in the first condition and the second passageway has a rectangular shape for placing the rotor blade in the second condition.

6. A retractable rotor system for an aircraft comprising:
a retractor connectable to the aircraft and having a spool rotatable in a first direction and a second direction opposite the first direction;
a rotor blade extending along a radial axis and having a first end secured to the spool and a second end extending away from the spool, the rotor blade being movable between a first condition having a first thickness and a second condition having a second thickness less than the first thickness, wherein the rotor blade includes a movable portion and a stationary portion each extending longitudinally along the rotor blade, the movable portion and stationary portion being movable relative to one another to transition the rotor blade between the first and second conditions; and
a support frame connectable to the aircraft through which the rotor blade extends to secure the first end of the rotor blade to the spool;
wherein the spool is rotatable in the first direction to unwind the rotor blade from the spool and to extend the rotor blade away from the support frame and place the rotor blade in the first condition, and the spool is rotatable in the second direction to wind the rotor blade on to the spool and to retract the rotor blade into the support frame and place the rotor blade in the second condition.

7. The retractable rotor system of claim 6, further comprising a fixed actuating member for moving the movable portion relative to the stationary portion, the actuating member extending between a pair of passageways in the support frame and within the rotor blade, the spool being rotatable in the first direction to cause the actuating member to move the movable portion toward the stationary portion to allow the rotor blade to reach the first condition, the spool being rotatable in the second direction to cause the actuating member to move the movable portion away from the stationary portion to allow the rotor blade to reach the second condition.

8. The retractable rotor system of claim 7, wherein the fixed actuating member has a frustoconical shape.

9. The retractable rotor system of claim 6, wherein the rotor blade includes a first portion having a first material thickness and a second portion extending from the first portion and having at least one layer having second material thickness less than the first material thickness, the second portion comprising the movable portion.

10. The retractable rotor system of claim 6, wherein the rotor blade includes a first portion having a first material thickness and a second portion extending from the first portion and comprising a material more elastic than the material of the first portion, the second portion comprising the movable portion.

11. A retractable rotor system for an aircraft comprising:
a retractor connectable to the aircraft and having a spool rotatable in a first direction and a second direction opposite the first direction;
a rotor blade extending along a radial axis and having a first end secured to the spool and a second end extending away from the spool, the rotor blade being movable between a first condition having a first thickness and a second condition having a second thickness less than the first thickness;
a support frame connectable to the aircraft through which the rotor blade extends to secure the first end of the rotor blade to the spool; and
a pair of rollers rotatably mounted in the support frame and extending into a passageway in the support frame through which the rotor blade extends for compressing the rotor blade to place the rotor blade in the second condition;
wherein the spool is rotatable in the first direction to unwind the rotor blade from the spool and to extend the rotor blade away from the support frame and place the rotor blade in the first condition, and the spool is rotatable in the second direction to wind the rotor blade on to the spool and to retract the rotor blade into the support frame and place the rotor blade in the second condition.

12. A retractable rotor system for an aircraft comprising:
a retractor connectable to the aircraft and having a spool rotatable in a first direction and a second direction opposite the first direction;
a rotor blade extending along a radial axis and having a first end secured to the spool and a second end extending away from the spool, the rotor blade being movable between a first condition having a first thickness and a second condition having a second thickness less than the first thickness, the rotor blade including a first portion having a first material thickness and a second portion extending from the first portion and having at least one layer having second material thickness less than the first material thickness or comprised of a more elastic material than the first material; and
a support frame connectable to the aircraft through which the rotor blade extends to secure the first end of the rotor blade to the spool;
wherein the spool is rotatable in the first direction to unwind the rotor blade from the spool and to extend the rotor blade away from the support frame and place the rotor blade in the first condition, and the spool is rotatable in the second direction to wind the rotor blade on to the spool and to retract the rotor blade into the support frame and place the rotor blade in the second condition.

13. The retractable rotor system of claim 12, wherein the second portion includes a plurality of layers, each layer in the second portion having a first end and a second end, the first ends being secured to one another and to the first portion of the rotor blade, the second ends being unsecured to one another.

14. A retractable rotor system for an aircraft comprising:
a retractor connectable to the aircraft and having a spool rotatable in a first direction and a second direction opposite the first direction;
a rotor blade extending along a radial axis and having a first end secured to the spool and a second end extending away from the spool, the rotor blade being movable between a first condition having a first thickness and a second condition having a second thickness less than the first thickness, the rotor blade being rigid normal to the plane of the rotor blade when in the first condition and flexible normal to the plane of the rotor blade when in the second condition; and
a support frame connectable to the aircraft through which the rotor blade extends to secure the first end of the rotor blade to the spool;
wherein the spool is rotatable in the first direction to unwind the rotor blade from the spool and to extend the rotor blade away from the support frame and place the rotor blade in the first condition, and the spool is rotatable in the second direction to wind the rotor blade on to the spool and to retract the rotor blade into the support frame and place the rotor blade in the second condition.

15. A retractable rotor system for an aircraft comprising:
a retractor connectable to the aircraft and having a spool rotatable in a first direction and a second direction opposite the first direction;
a rotor blade airfoil section extending along an axis and having a first end secured to the spool and a second end extending away from the spool, the rotor blade including a movable portion and a stationary portion each extending longitudinally along the rotor blade, the rotor blade being movable between a rigid first condition having a first thickness and a flexible second condition having a second thickness less than the first thickness;
a support frame connectable to the aircraft and having a pair of passageways through which the rotor blade extends to secure the first end of the rotor blade to the spool; and
a stationary actuating member extending between the passageways and positioned within the portion of the rotor blade in the first condition, wherein the spool is rotatable in the first direction to unwind the rotor blade from the spool such that the actuating member moves the movable portion towards the stationary portion to place the rotor blade in the first condition, the spool being rotatable in the second direction to wind the rotor blade on to the spool such that the actuating member moves the movable portion away from the stationary portion to place the rotor blade in the second condition.

16. The retractable rotor system of claim 15, wherein the rotor blade has an expanded, airfoil shape in the first condition and a collapsed, substantially planar shape in the second condition.

17. The retractable rotor system of claim 15, further comprising a collapsible web positioned within an interior of the rotor blade for biasing the rotor blade towards the first condition.

18. The retractable rotor system of claim 15, wherein the actuating member has a frustoconical shape.

19. The retractable rotor system of claim 15, wherein the rotor blade includes a first portion having a first material thickness and a second portion extending from the first portion and having a plurality of layers each having a second material thickness less than the first material thickness or comprised of a more elastic material than the first material, the second portion including the movable portion.

20. The retractable rotor system of claim 19, wherein each layer in the second portion has a first end and a second end, the first ends being secured to one another and to the first portion of the rotor blade, the second ends being unsecured to one another.

21. The retractable rotor system of claim 15, further comprising a pair of rollers rotatably mounted in the frame and extending into one of the pair of passageways in the frame through which the rotor blade extends for compressing the rotor blade to place the rotor blade in the second condition.

22. An aircraft comprising:
a body;
a pair of fixed wings and a rotor mast extending from the body;
a gear positioned within the rotor mast and drivable by a motor or gear/clutch system; and
a plurality of retractable rotor systems, each comprising:
a retractor having a spool rotatable by the gear in a first direction and a second direction opposite the first direction;
a rotor blade extending along a radial axis and having a first end secured to the spool and a second end extending away from the spool, the rotor blade including a movable portion and a stationary portion each extending longitudinally along the rotor blade, the rotor blade being movable between a rigid first condition having a first thickness and a flexible second condition having a second thickness less than the first thickness;
a support frame connected to the rotor mast and having a pair of passageways through which the rotor blade extends to secure the first end of the rotor blade to the spool; and
an actuating member extending between the passageways and positioned within the rotor blade, wherein the spool is rotatable by the gear in the first direction to unwind the rotor blade from the spool such that the actuating member moves the movable portion towards the stationary portion to place the rotor blade in the first condition, the spool being rotatable by the gear in the second direction to wind the rotor blade on to the spool such that the actuating member moves the movable portion away from the stationary portion to place the rotor blade in the second condition.

* * * * *